US011790815B1

(12) United States Patent
Yoshiga

(10) Patent No.: US 11,790,815 B1
(45) Date of Patent: Oct. 17, 2023

(54) DISPLAY DEVICE CAPABLE OF DECRYPTING VISUAL SECRET INFORMATION

(71) Applicant: InnoLux Corporation, Miao-Li County (TW)

(72) Inventor: Masahiro Yoshiga, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 17/879,799

(22) Filed: Aug. 3, 2022

(51) Int. Cl.
*G09G 3/00* (2006.01)
*G09G 3/3208* (2016.01)
*G06F 21/60* (2013.01)
*G09G 3/32* (2016.01)
*G02B 5/08* (2006.01)

(52) U.S. Cl.
CPC .......... *G09G 3/001* (2013.01); *G06F 21/602* (2013.01); *G09G 3/3208* (2013.01); *G02B 5/08* (2013.01); *G09G 3/32* (2013.01); *G09G 2300/023* (2013.01); *G09G 2340/10* (2013.01); *G09G 2358/00* (2013.01)

(58) Field of Classification Search
CPC .......... G09G 2358/00; G09G 2300/023; G06F 21/602
See application file for complete search history.

(56) References Cited

U.S. PATENT DOCUMENTS

| | | | | |
|---|---|---|---|---|
| 7,352,373 | B2* | 4/2008 | Feng | H04N 1/64 |
| | | | | 345/611 |
| 9,978,299 | B2* | 5/2018 | Tang | G02B 27/01 |
| 10,692,186 | B1* | 6/2020 | Mercier | G06F 3/013 |
| 2004/0086196 | A1* | 5/2004 | Harrington | G06T 1/0071 |
| | | | | 382/276 |
| 2005/0117748 | A1 | 6/2005 | Schrijen | |
| 2011/0261091 | A1* | 10/2011 | Nose | G09G 3/3611 |
| | | | | 345/89 |
| 2014/0139458 | A1* | 5/2014 | Premutico | H10K 59/121 |
| | | | | 345/82 |
| 2021/0103145 | A1* | 4/2021 | You | G02B 27/0149 |
| 2022/0157265 | A1* | 5/2022 | Lee | G09G 3/003 |
| 2022/0292838 | A1* | 9/2022 | Okamoto | B60K 35/00 |

FOREIGN PATENT DOCUMENTS

CN          1628432 A     6/2005

* cited by examiner

*Primary Examiner* — William Boddie
*Assistant Examiner* — Bipin Gyawali
(74) *Attorney, Agent, or Firm* — Winston Hsu

(57) ABSTRACT

A display device having a plurality of light emitting regions and a plurality of transparent regions alternately disposed is provided. The display device includes a display module and a reflection element. The display module includes a front pixel and a rear pixel disposed opposite to the front pixel, the front pixel and the rear pixel are disposed in the plurality of light emitting regions, and the front pixel displays a first image in the plurality of light emitting regions. The reflection element is disposed at a side of the display module adjacent to the rear pixel, wherein the reflection element reflects a second image displayed by the rear pixel to form a third image. The first image in the plurality of light emitting regions and the third image in the plurality of transparent regions are combined to show a predetermined image.

18 Claims, 9 Drawing Sheets

DISPLAY DEVICE CAPABLE OF DECRYPTING VISUAL SECRET INFORMATION

BACKGROUND OF THE DISCLOSURE

1. Field of the Disclosure

The present disclosure relates to a display device, and more particularly relates to a display device capable of decrypting a visual secret sharing image.

2. Description of the Prior Art

Visual cryptography is a cryptographic technique that makes secret visual information capable of being encrypted and decrypted as images that can be shared. The encrypted secret visual information can be decrypted by merging the visual images for decryption. However, current display devices cannot directly decrypt the secret visual information, and additional software is needed in the process of decryption, thereby making the decryption process more complicated and inconvenient. Therefore, a display device that can improve the decryption process is needed in the related field.

SUMMARY OF THE DISCLOSURE

A display device is provided by the present disclosure, wherein the display device can directly decrypt secret visual information.

In some embodiments, a display device having a plurality of light emitting regions and a plurality of transparent regions alternately disposed is provided by the present disclosure. The display device includes a display module and a reflection element. The display module includes a front pixel and a rear pixel disposed opposite to the front pixel, the front pixel and the rear pixel are disposed in the plurality of light emitting regions, and the front pixel displays a first image in the plurality of light emitting regions. The reflection element is disposed at a side of the display module adjacent to the rear pixel, wherein the reflection element reflects a second image displayed by the rear pixel to form a third image. The first image in the plurality of light emitting regions and the third image in the plurality of transparent regions are combined to show a predetermined image.

In some embodiments, a method of displaying a predetermined image through a display device is provided by the present disclosure. The method includes providing the display device, wherein the display device has a plurality of light emitting regions and a plurality of transparent regions alternately disposed, the display device includes a display module and a reflection element, the display module includes a front pixel and a rear pixel disposed opposite to the front pixel, and the reflection element is disposed at a side of the display module adjacent to the rear pixel, displaying a first image through the front pixel, wherein the first image is located in the plurality of light emitting regions, and displaying a second image through the rear pixel. The second image is reflected by the reflection element to form a third image in the plurality of transparent regions, and the first image and the third image are combined to form the predetermined image.

These and other objectives of the present disclosure will no doubt become obvious to those of ordinary skill in the art after reading the following detailed description of the embodiment that is illustrated in the various figures and drawings.

DETAILED DESCRIPTION

Figure 1:
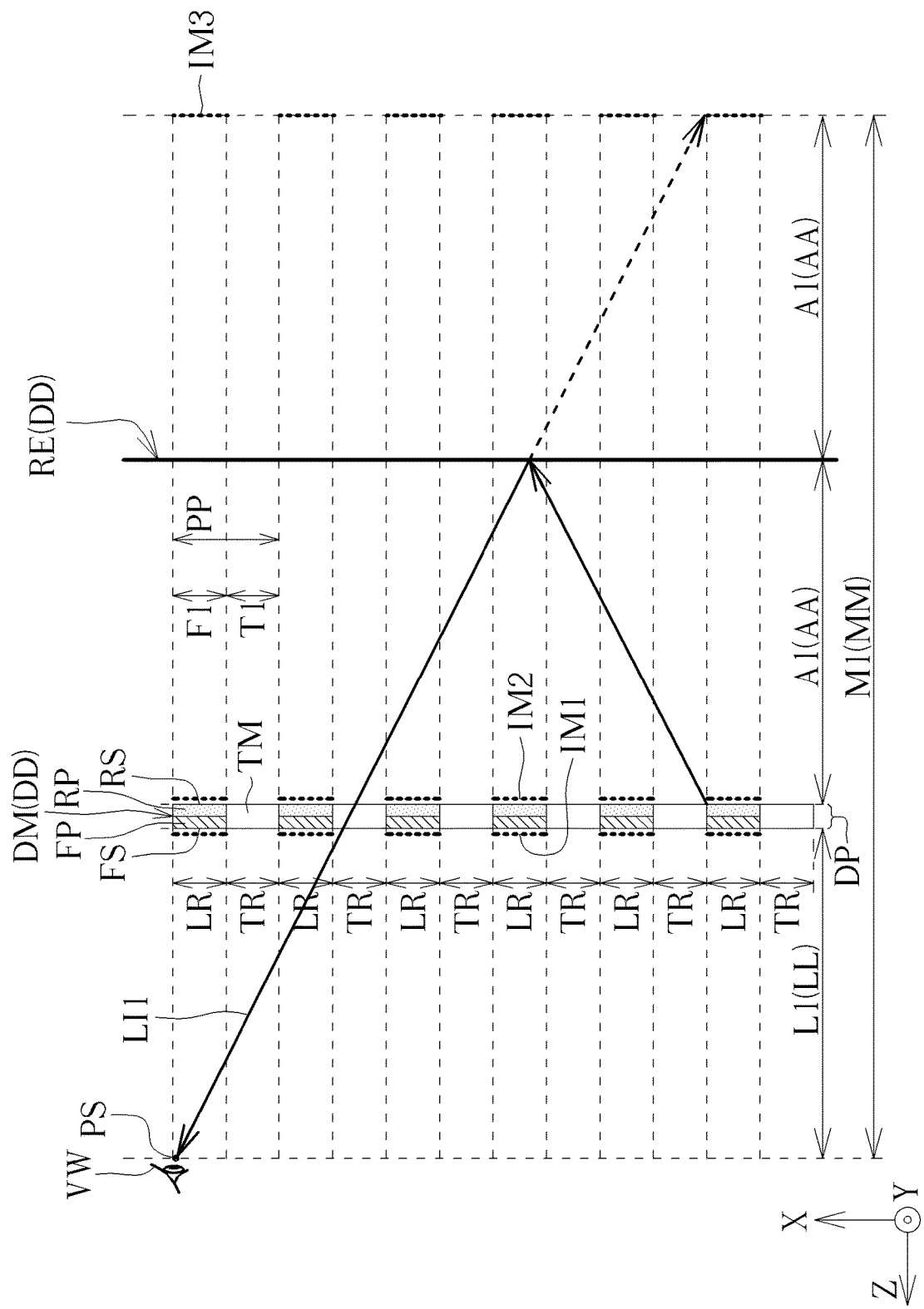
FIG. 1 schematically illustrates a cross-sectional view of a display device according to a first embodiment of the present disclosure.

The present disclosure may be understood by reference to the following detailed description, taken in conjunction with the drawings as described below. It is noted that, for purposes of illustrative clarity and being easily understood by the readers, various drawings of this disclosure show a portion of the electronic device, and certain elements in various drawings may not be drawn to scale. In addition, the number and dimension of each element shown in drawings are only illustrative and are not intended to limit the scope of the present disclosure.

Certain terms are used throughout the description and following claims to refer to particular elements. As one skilled in the art will understand, electronic equipment manufacturers may refer to an element by different names. This document does not intend to distinguish between elements that differ in name but not function.

In the following description and in the claims, the terms "include", "comprise" and "have" are used in an open-ended fashion, and thus should be interpreted to mean "include, but not limited to . . . ".

It will be understood that when an element or layer is referred to as being "disposed on" or "connected to" another element or layer, it can be directly on or directly connected to the other element or layer, or intervening elements or layers may be presented (indirectly). In contrast, when an element is referred to as being "directly on" or "directly connected to" another element or layer, there are no intervening elements or layers presented. When an element or a layer is referred to as being "electrically connected" to another element or layer, it can be a direct electrical connection or an indirect electrical connection.

The terms "approximately", "substantially" or "approximately" are generally interpreted as being within ±20% of the given value, or interpreted as being within ±10%, ±5%, ±3%, ±2%, ±1%, or ±0.5% of the given value.

Although terms such as first, second, third, etc., maybe used to describe diverse constituent elements, such constituent elements are not limited by the terms. The terms are used only to discriminate a constituent element from other constituent elements in the specification. The claims may not use the same terms, but instead may use the terms first, second, third, etc. with respect to the order in which an element is claimed. Accordingly, in the following description, a first constituent element maybe a second constituent element in a claim.

It should be noted that the technical features in different embodiments described in the following can be replaced, recombined, or mixed with one another to constitute another embodiment without departing from the spirit of the present disclosure.

The display device of the present disclosure may be applied to various kinds of electronic device, such as antenna, sensing device or tiled device, but not limited thereto. The display device may be a foldable display device or a flexible display device. The display device may be a non-self-luminous display device or a self-luminous display device. The antenna may be a liquid crystal antenna or a non-liquid crystal antenna. The sensing device may be a device capable of sensing capacitance, light, heat or ultrasonic wave, but not limited thereto. In the present disclosure, the electronic element in the display device may include passive elements or active elements, such as capacitor, resistor, inductor, diode, transistor, and the like. The diode may include a light emitting diode or a photo diode. The light emitting diode may for example include an organic light emitting diode (OLED), a mini light emitting diode (mini LED), a micro light emitting diode (micro LED) or a quantum dot light emitting diode (QLED), but not limited thereto. The tiled device may be a tiled display device or a tiled antenna, but not limited thereto.

Referring to FIG. 1, FIG. 1 schematically illustrates a cross-sectional view of a display device according to a first embodiment of the present disclosure. As shown in FIG. 1, the display device DD of the present embodiment may include a display module DM and a reflection element RE, but not limited thereto. The display module DM of the present embodiment may be a double-sided transparent display module. That is, the light emitted from the display module DM may be observed by a viewer through both sides of the display module DM. For example, the display module DM may have a front surface FS and a rear surface RS opposite to the front surface FS, and the display module DM may display images on both the front surface FS and the rear surface RS of the display module DM, but not limited thereto.

According to the present embodiment, the display module DM may include at least one front pixel FP and at least one rear pixel RP, wherein the rear pixel RP may be disposed opposite to the front pixel FP. Specifically, as shown in FIG. 1, the display module DM may have a plurality of front pixels FP and a plurality of rear pixels RP, wherein one of the rear pixels may be disposed opposite to one of the front pixels FP. In other words, one of the front pixels FP and one of the rear pixels RP may be disposed corresponding to each other and form a pair of pixels, and the display module DM may include multiple pairs of pixels, but not limited thereto. The front pixels FP may be disposed adjacent to the front surface FS, and the rear pixels RP may be disposed adjacent to the rear surface RS. Therefore, the light emitted from the front pixels FP may pass through the front surface FS, and the images displayed by the front pixels FP may be observed through the front surface FS; the light emitted from the rear pixels RP may pass through the rear surface RS, and the images displayed by the rear pixels RP may be observed through the rear surface RS.

According to the present embodiment, the display module DM may further include a transparent unit TM. In other words, at least a portion of the display module DM may be formed of the transparent unit TM. The transparent unit TM may include liquid crystal, polymer and/or any suitable transparent insulating material. In detail, as shown in FIG. 1, some portions of the display module DM may include the transparent unit TM, at which no front pixels FP and rear pixels RP are disposed. The portions of the display module DM including transparent unit TM may respectively be disposed between adjacent front pixels FP and between adjacent rear pixels RP, but not limited thereto. That is, the transparent unit TM may separate adjacent front pixels FP and adjacent rear pixels RP. From the above, one of the front pixels FP and one of the rear pixels RP maybe disposed opposite to each other to form a pixel pair, and the transparent unit TM may be disposed between adjacent pixel pairs formed of the front pixels FP and the rear pixels RP. Therefore, the pixel pairs formed of the front pixels FP and the rear pixels RP and the transparent unit TM maybe disposed alternately in the display module DM, but not limited thereto. In the present embodiment, the region in which the front pixels FP and the rear pixels RP are disposed may be defined as a light emitting region LR, and the region in which the transparent unit TM is disposed may be defined as a transparent region TR. That is, the front pixels FP and the rear pixels RP are disposed in the light emitting regions LR, but not in the transparent regions TR. The light emitting region LR where the front pixel FP and the rear pixel RP are disposed may be the region of the display module DM that can display images, and the transparent region TR where the transparent unit TM is disposed may be the region of the display module DM that does not display image. In addition, since the transparent region TR may include the transparent unit TM, a viewer may see through the display module DM through the transparent region TR, but not limited thereto. As shown in FIG. 1, the display module DM of the display device DD may have a plurality of light emitting regions LR and a plurality of transparent regions TR, wherein the light emitting regions LR and the transparent regions TR may be alternately disposed. It should be noted that one of the light emitting regions LR may include one front pixel FP and one rear pixel RP in the present embodiment, but not limited thereto. In some embodiments, one of the light emitting regions LR may include two or more front pixels FP and rear pixels RP.

In the present embodiment, the display module DM may include a display panel DP, wherein the front pixels FP and the rear pixels RP may both be disposed in the display panel DP, but not limited thereto. In other words, the display panel DP may include the front pixels FP, the rear pixels RP and the transparent unit TM. In some embodiments, the display module DM may include two display panels DP attached to each other, wherein the front pixels FP may be disposed in one of the two display panels DP (such as a front display panel), and the rear pixels RP may be disposed in another one of the two display panels DP (such as a rear display panel). In such case, the front pixels FP and the rear pixels RP may be disposed in different display panels DP. In detail, a front display panel DP may include the front pixels FP and the transparent unit TM, a rear display panel DP may include the rear pixels RP and the transparent unit TM, and the two display panels DP may be attached to each other to form the display module DM in a way that one of the front pixels FP is corresponding to one of the rear pixels RP, and the transparent unit TM in the two display panels DP are corresponding to each other, but not limited thereto. It should be noted that the structure of the display module DM is not limited to the above-mentioned content, and the display module DM may include any suitable structure according to the demands of the design of the display module DM.

Although it is not shown in the figures, the display panel DP may include any suitable layer or element capable of being applied to the display panel DP. For example, the display panel DP may be a self-luminous display panel and include a substrate, at least a circuit layer disposed on the substrate and a plurality of light emitting units disposed on the circuit layer (not illustrated), but not limited thereto. The substrate may include a rigid substrate or a flexible substrate. The rigid substrate may include glass, ceramic, quartz, sapphire, acrylic, other suitable materials or the combinations of the above-mentioned materials. The flexible substrate may include polyimide (PI), polyethylene terephthalate (PET), polycarbonate (PC), other suitable materials or the combinations of the above-mentioned materials. The circuit layer may include wires, active elements and/or passive elements that can be applied to the display panel DP. The circuit layer may be electrically connected to the light emitting units so as to control light emission of the light emitting units. The light emitting units may for example include light emitting diodes, but not limited thereto. The light emitting diode may for example include an organic light emitting diode (OLED), a quantum light-emitting diode (QLED) or a light emitting diode (LED), but not limited thereto. The light emitting diode may for example include a mini light emitting diode (mini LED) or a micro light emitting diode (micro LED), but not limited thereto. In the present embodiment, each of the front pixels FP and each of the rear pixels RP may respectively include a portion of the light emitting units and a portion of the circuit layer corresponding to the portion of the light emitting units. Therefore, the front pixels FP and the rear pixels RP may respectively include mini light emitting diodes, micro light emitting diodes or organic light emitting diodes. It should be noted that the types of the light emitting diodes respectively included in the front pixels FP and in the rear pixels RP may be different or the same, and the present disclosure is not limited thereto. In addition, the circuit layer and the light emitting units may not be disposed in the transparent regions TR of the display module DM. The structure of the display panel DP of the present embodiment is not limited to the above-mentioned structure. In some embodiments, the display panel DP may be a non-self-luminous display panel and include a backlight module, a circuit layer and a light modulating layer, but not limited thereto.

As mentioned above, the display device DD may include the reflection element RE. The reflection element RE may be any suitable element that can reflect light. For example, the reflection element RE may be a flat mirror in the present embodiment, but not limited thereto. According to the present embodiment, the reflection element RE may be disposed at a side of the display module DM adjacent to the rear pixels RP. That is, the reflection element RE may face the rear surface RS of the display module DM. In the present embodiment, the reflection element RE may not be disposed in the display module DM, and the reflection element RE may be disposed apart from the display module DM by a distance (such as the distance A1 shown in FIG. 1). That is, the reflection element RE is not a part of the display module DM. Since the reflection element RE is disposed at a position facing the rear pixels RP, the reflection element RE is capable of reflecting the light emitted from the rear pixels RP in the display module DM.

According to the present embodiment, the front pixels FP may display a first image IM1 in the light emitting regions LR. In addition, the rear pixels RP may display a second image IM2 in the light emitting regions LR. It should be noted that although the first image IM1 and the second image IM2 shown in FIG. 1 are respectively above the front surface FS and the rear surface RS, it is just for clearly label the first image IM1 and the second image IM2 in FIG. 1, and the real positions of the first image IM1 and the second image IM2 are not limited to what is shown in FIG. 1. In the present embodiment, the first image IM1 may be displayed by one front pixel FP or multiple front pixels FP, and the second image IM2 may be displayed by one rear pixel RP or multiple rear pixels RP. In addition, the number of the front pixels FP for displaying the first image IM1 and the number of the rear pixels RP for displaying the second image IM2 may be different and are not limited by the present disclosure.

Figure 3:
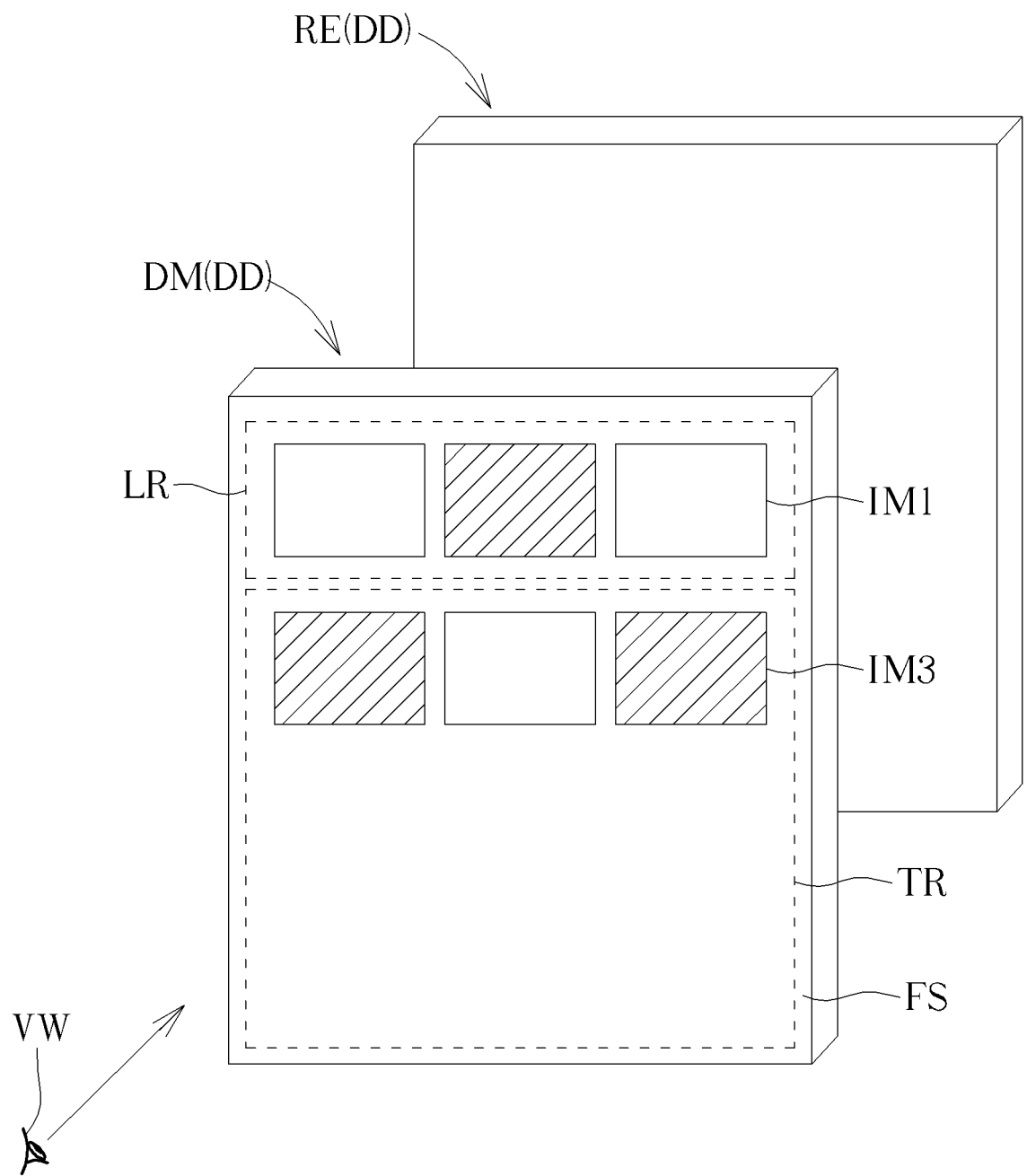
FIG. 3 schematically illustrates locations of images observed by the viewer according to the first embodiment of the present disclosure.

Referring to FIG. 1 and FIG. 3, FIG. 3 schematically illustrates locations of images observed by the viewer according to the first embodiment of the present disclosure. According to the present embodiment, as shown in FIG. 1, when a viewer VW observes the display device DD, the viewer VW may be located at a viewing position PS facing the front surface FS (or the front pixels FP) of the display module DM. The viewer VW may observe the display device DD along a normal direction of the display module DM, which is parallel to the direction Z, but not limited thereto. That is, the viewer VW may directly see the front surface FS of the display module DM. Therefore, the viewer VW may directly observe the first image IM1 in the light emitting regions LR since the first image IM1 is displayed by the front pixels FP facing the viewer VW. In another aspect, since the second image IM2 is displayed by the rear pixels RP not facing the viewer VW, the viewer VW may not directly see the second image IM2. However, since the display device DD includes the reflection element RE disposed facing the rear pixels RP, and the display module DM may include the transparent regions TR, the light emitted from the rear pixels RP may be reflected by the reflection element RE and pass through the transparent regions TR of the display module DM, thereby being perceived by the viewer VW. For example, as shown in FIG. 1, a light LI1 emitted from the rear pixel RP may be reflected by the reflection element RE, and then the reflected light LI1 may pass through the transparent region TR and be perceived by the viewer VW, but not limited thereto. Therefore, the viewer VW can observe the second image IM2 through the reflection element RE and the transparent region TR. In detail, the reflection element RE may reflect the second image IM2 displayed by the rear pixels RP to form a third image IM3, and the third image IM3 may be observed by the viewer VW through the transparent regions TR, but not limited thereto. In other words, when the third image IM3 is observed by the viewer VW through the transparent regions TR, the third image IM3 may be located in the transparent regions TR in viewer's eyes. For example, as shown in FIG. 3, when the viewer VW observes the display device DD at a position facing the front surface FS of the display module DM, the viewer VW may directly see the first image IM1 displayed by the front pixels FP in the light emitting region(s) LR and the third image IM3 formed by reflecting the second image IM2 through the reflection element RE through the transparent region(s) TR, wherein the third image IM3 may be located in the transparent region(s) in viewer's eyes since the third image IM3 is observed by the viewer VW through the transparent region(s) TR. In addition, the third image IM3 formed by reflecting the second image IM2 through the reflection element RE is a virtual image. It should be noted that in order to simplify the figure, the display module DM shown in FIG. 3 just includes one light emitting region LR and one transparent region TR, but the present embodiment is not limited thereto. In addition, the area of the transparent region TR and the area of the light emitting region LR may be the same or different. In some embodiments, as shown in FIG. 1, the area of the transparent region TR and the area of the light emitting region LR may be the same. In some embodiments, as shown in FIG. 3, the area of the transparent region TR may be greater than the area of the light emitting region LR.

Figure 2:
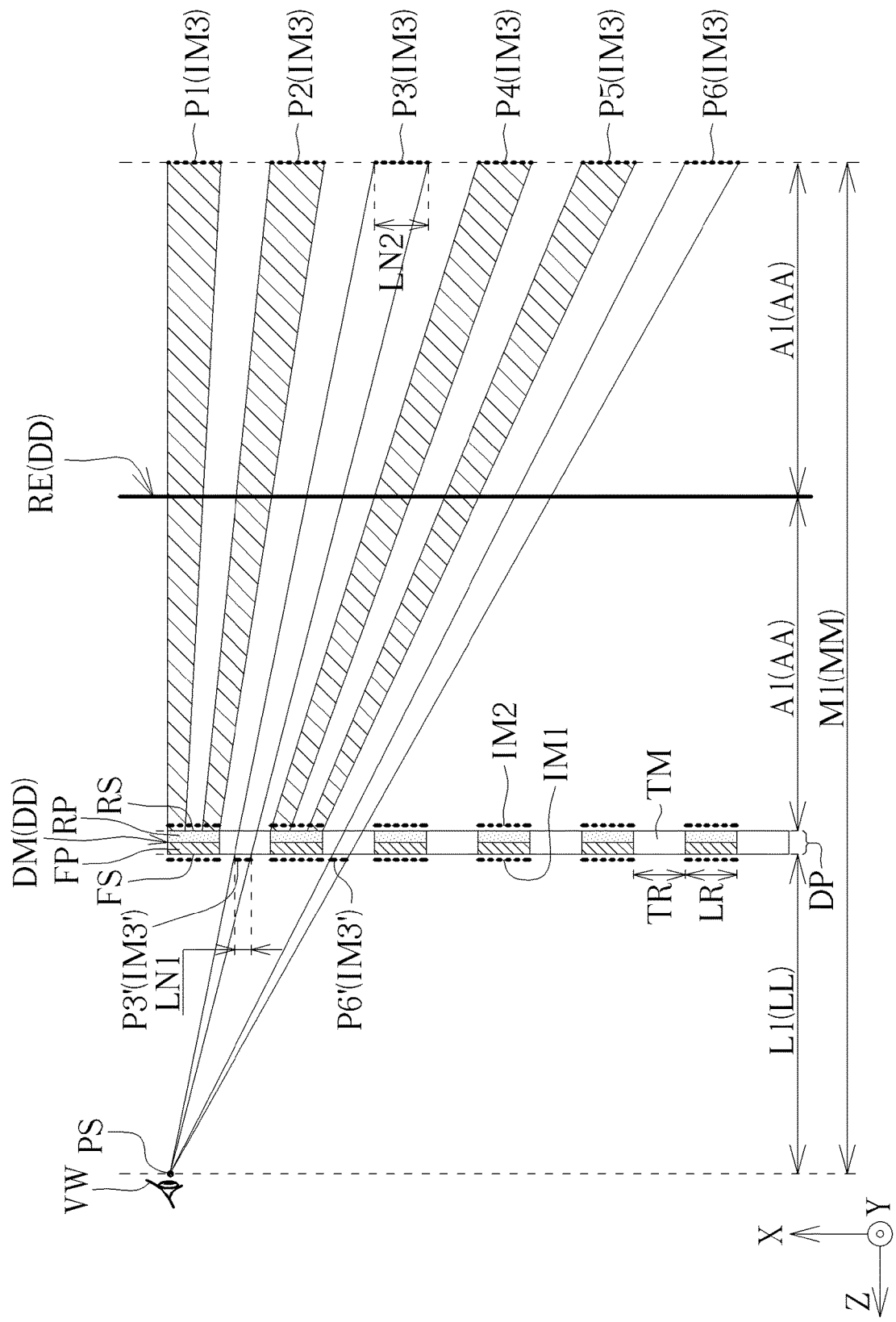
FIG. 2 schematically illustrates the display device according to the first embodiment of the present disclosure being observed by a viewer.

Referring to FIG. 2, FIG. 2 schematically illustrates the display device according to the first embodiment of the present disclosure being observed by a viewer. As mentioned above, the third image IM3 is a reflection of the second image IM2 through the reflection element RE, wherein the third image IM3 may be observed by the viewer VW. It should be noted that "the third image IM3 can be observed by the viewer" mentioned above includes the condition that at least a portion of the third image IM3 is observed by the viewer VW. Specifically, since the third image IM3 is observed by the viewer VW through the transparent regions TR, and the transparent regions TR are alternately disposed with the non-transparent regions (that is, the light emitting regions LR), a portion of the third image IM3 may be blocked by the light emitting regions LR when the viewer VW observes the display device DD, and the portion of the third image IM3 may not be observed by the viewer VW. For example, as shown in FIG. 2, when the viewer VW observes the display device DD, a portion P3 and a portion P6 of the third image IM3 may be observed by the viewer VW through the transparent regions TR, while a portion P1, a portion P2, a portion P4 and a portion P5 of the third image IM3 may be blocked by the light emitting regions LR and may not be observed by the viewer VW. Furthermore, the portion P3 and portion P6 of the third image IM3 observed by the viewer VW in the transparent regions TR at the front surface FS may be represented as the portion P3' and portion P6' of a perceived third image IM3', wherein the perceived third image IM3' represent the third image IM3 observed by the viewer VW through the transparent regions TR at the front surface FS. It should be noted that the portions of the third image IM3 that can be observed by the viewer VW may be different when the viewing position PS is changed. In addition, the proportion of the third image IM3 that can be observed by the viewer VW may be variable according to the distance between the display module DM and the reflection element RE (that is, the first distance A1) and/or the distance between the viewer VW and the display module DM (that is, the second distance L1).

Figure 4:
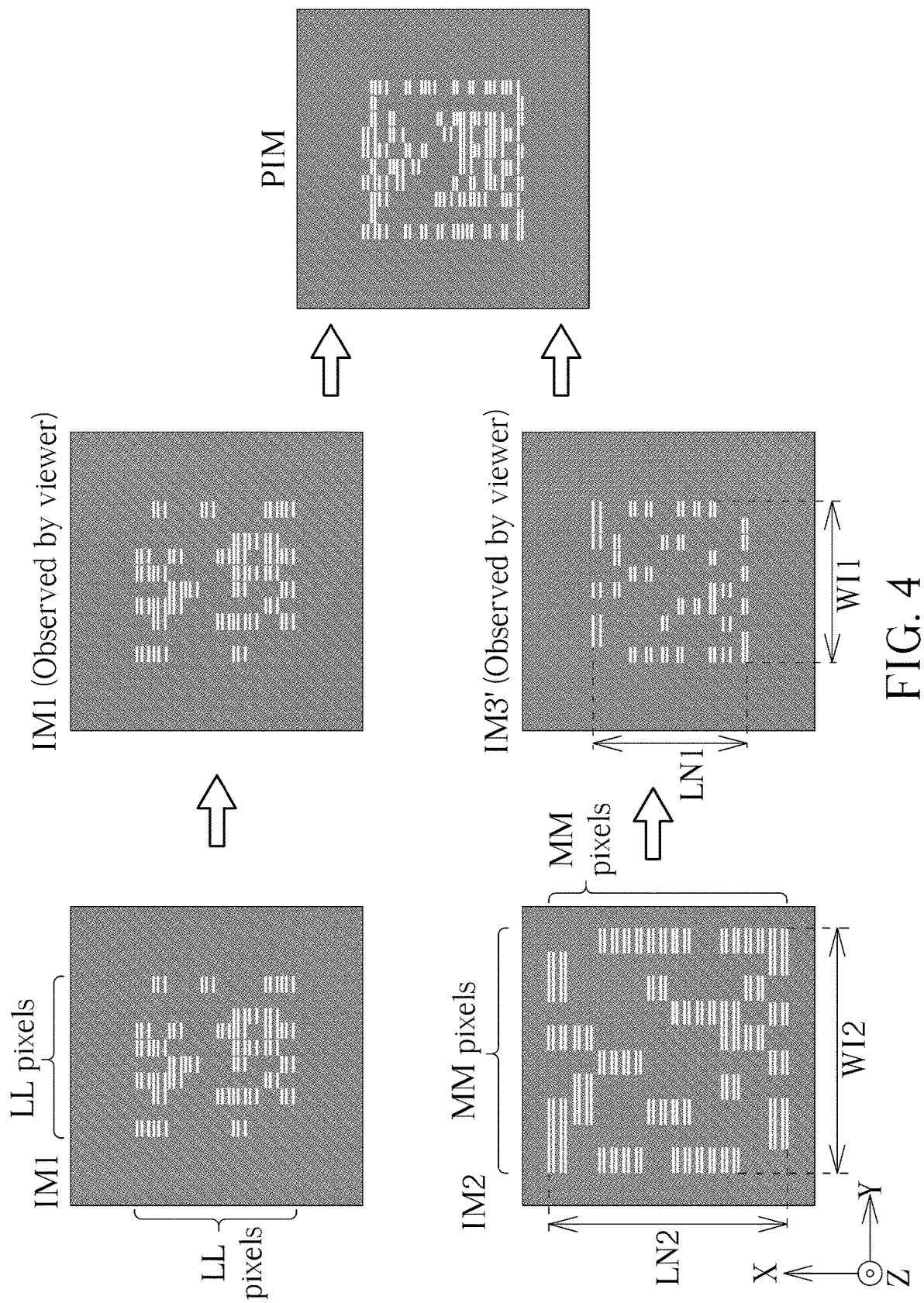
FIG. 4 schematically illustrates combination of the images to form a predetermined image according to the first embodiment of the present disclosure.

FIG. 4 schematically illustrates combination of the images to form a predetermined image according to the first embodiment of the present disclosure. Referring to FIG. 4 together with FIG. 2, when the viewer VW observes the display device DD at the viewing position PS, the viewer VW may observe the first image IM1 displayed by the front pixels FP in the light emitting regions LR and the third image IM3 formed by reflection of the second image IM2 through the transparent regions TR. According to the present embodiment, the first image IM1 in the light emitting regions LR and the perceived third image IM3' observed by the viewer VW through the transparent regions TR may be combined to show a predetermined image PIM. That is, the first image IM1 in the light emitting regions LR and the third image in the transparent regions TR (the perceived third image IM3') can be combined to show the predetermined image PIM. Specifically, when the viewer VW observes the display device DD, the viewer VW may see the first image IM1 in the light emitting regions LR and the third image IM3 through the transparent regions TR, i.e., the perceived third image IM3', and the two images in different regions may be integrated into a new image in the viewer's eyes, which is the above-mentioned predetermined image PIM. In other words, the predetermined image PIM may be the combination of the first image IM1 in the light emitting regions LR and the perceived third image IM3' in the transparent regions TR in viewer's eyes. For example, as shown in FIG. 4, the first image IM1 observed by the viewer VW in the light emitting regions LR and the third image IM3 observed by the viewer VW in the transparent regions TR (i.e., the perceived third image IM3' shown in FIG. 2) may be combined to form the predetermined image PIM, but not limited thereto.

Since the display device DD of the present embodiment may display an image formed by combining other images displayed by the display module DM, the display device DD may serve as a decryptor of a secret visual information. In detail, the secret visual information may be hidden in the predetermined image PIM, and the predetermined image PIM may be encrypted to form two sharing images, wherein the two sharing images may be the first image IM1 and the third image IM3 observed by the viewer VW that can be displayed through the display device DD. Therefore, when the viewer VW observes the display device DD at a certain position (such as the viewing position PS, but not limited thereto), the viewer VW can observe the predetermined image PIM formed of combination of the sharing images (that is, the first image IM1 and the third image IM3 observed by the viewer VW), thereby obtaining the secret visual information hidden in the predetermined image PIM. For example, as shown in FIG. 4, the secret visual information hidden in the predetermined image PIM may be a letter "M", but not limited thereto. According to the present embodiment, since the display device DD may directly show the result of combination of the sharing images to obtain the predetermined image PIM, other software or devices may not be needed to decrypt the secret visual information, thereby improving the decryption process or making the decryption easier. The device composition of the display device DD serving as the decryptor, without being applied with a decrypting software or device, may be simplified. In addition, since the light emitting regions LR where one of the sharing images is showed and the transparent regions TR where another one of the sharing images is showed may be alternately disposed, the secret visual information may be unclear in the individual sharing images, or in other words, the secret visual information may not be easily recognized through the sharing images, thereby improving the security of the secret visual information. For example, as shown in FIG. 4, the secret visual information (that is, the letter "M") cannot be recognized easily through the first image IM1 or the third image IM3. In some embodiments, the display device DD may for example be applied to an automated teller machine (ATM), but not limited thereto. In detail, when a user stands in front of the ATM at the correct position, the user can see the hidden information (for example, the deposit or other private information) through the display device DD. On the other hand, when the others stands in front of the ATM at the wrong position (For example, wrong distance), the hidden information cannot be recognized by the others just through the display device DD. Therefore, the security of the private information may be improved.

Return to FIG. 2, according to the present embodiment, since the third image IM3 is not formed on the front surface FS of the display module DM, the size of the third image IM3 observed by the viewer VW through the transparent regions TR, i.e. the perceived third image IM3', may be different from the size of the third image IM3 itself. Specifically, since the third image IM3 is located at a side of the reflection element RE opposite to the display module DM (that is, away from the display module DM in viewer's eyes), the size of the perceived third image IM3' observed by the viewer VW through the transparent regions TR at the front surface FS may be smaller than the size of the third image IM3 itself. In detail, as shown in FIG. 2, the perceived third image IM3' may be regarded as the third image IM3 with a reduced size, but not limited thereto. Therefore, "the first image IM1 and the third image IM3 observed by the viewer VW may be combined to form the predetermined image PIM" mentioned above may represent that the predetermined image PIM may be formed of the combination of the first image IM1 and the perceived third image IM3'. It should be noted that since the third image IM3 is a mirror image of the second image IM2, the size of the second image IM2 would be the same as the size of the third image IM3, which is greater than the size of the perceived third image IM3'. "The size" of the perceived third image IM3' and the third image IM3 itself mentioned above may represent any suitable one-dimensional size, such as the length or the width, of the perceived third image IM3', the third image IM3 itself and/or the second image IM2. The "size" mentioned in the following content may be interpreted in the same way mentioned above, and will not be redundantly described. For example, the size of the perceived third image IM3' maybe the length LN1 of the perceived third image IM3', and the size of the third image IM3 may be the length LN2 of the third image IM3, but not limited thereto. The length LN1 and the length LN2 may be parallel to a direction X perpendicular to the direction Z, such as the vertical dimensions of the mentioned images, but not limited thereto.

According to the present embodiment, the ratio of the size of the perceived third image IM3' to the size of the third image IM3 is related to the distance between the viewing position PS of the viewer VW and the display module DM and the distance between the display module DM and the reflection element RE. In addition, since the size of the second image IM2 and the size of the third image IM3 are the same, the ratio of the size of the perceived third image IM3' to the size of the second image IM2 may be the same as the ratio of the size of the perceived third image IM3' to the size of the third image IM3. As shown in FIG. 2, viewing position PS may be defined as a position where the viewer is located and can see the predetermined image PIM, the reflection element RE may be disposed apart from the display module DM by a first distance A1, a second distance L1 may be included between the viewing position PS and the display module DM, and a third distance M1 may be included between the viewing position PS and the third image IM3, in the direction Z parallel to the normal direction of the display module DM. The first distance A1 is defined as the distance between the rear surface RS of the display module DM and the surface of the reflection element RE facing the rear surface RS, but not limited thereto. The second distance L1 is defined as the distance between the viewing position PS and the front surface FS of the display module DM, but not limited thereto. According to the present embodiment, the ratio R1 of the size of the perceived third image IM3' to the size of the second image IM2 (or the third image IM3) may satisfy the following formula (1).

$$R1 = L1/M1 \qquad (1)$$

In addition, it can be seen from FIG. 2 that the third distance M1 maybe a sum of the second distance L1, the thickness of the display module DM, the first distance A1 and the distance between the reflection element RE and the third image IM3. In the present embodiment, the distance between the reflection element RE and the third image IM3 may be equal to the first distance A1 since the third image IM3 is a mirror image of the second image IM2, and the thickness of the display module DM may be neglected since they are significantly smaller than the first distance A1 and the second distance L1. Therefore, the ratio R1 of the size of the third image IM3 observed by the viewer VW (that is, the perceived third image IM3') to the size of the second image IM2 may satisfy the following formula (2).

$$R1 = L1/(L1+2*A1) \qquad (2)$$

As mentioned above, the size of the perceived third image IM3' maybe the length LN1 of the perceived third image IM3', and the size of the second image may be the length of the second image IM2, which is the same as the length LN2 of the third image IM3. Therefore, the ratio R1 may equal to the ratio of the length LN1 to the length LN2 (that is, R1=LN1/LN2), but not limited thereto. In some embodiments, the ratio R1 may equal to the ratio of a width WI1 of the perceived third image IM3' to a width WI2 of the second image IM2 (that is, R1=WI1/WI2), wherein the width WI2 may also be the width of the third image IM3. For example, the above-mentioned widths maybe the lateral dimensions of these images in the direction Y, but not limited thereto. Accordingly, a ratio R2 of an area of the perceived third image IM3' to an area of the second image IM2 (or the third image IM3) may be square of the ratio R1 (that is, R2=R1$^2$). For example, when the second distance L1 is 60 centimeters (cm), and the third distance M1 is 180 cm, the ratio R1 of the length LN1 (or the width WI1) of the perceived third image IM3' to the length LN2 (or the width WI2) of the second image IM2 may be 1/3, and the ratio R2 of the area of the perceived third image IM3' to the area of the second image IM2 may be 1/9, but not limited thereto.

In the present embodiment, a relative distance may be defined to describe the distance numerically. In detail, as shown in FIG. 2, a relative distance LL may be included between the viewing position PS and the front surface FS of the display module DM, and a relative distance MM may be included between the viewing position PS and the third image IM3, wherein the relative distance LL and the relative distance MM may be determined according to the ratio of the second distance L1 to the third distance M1. For example, when the second distance L1 is 60 cm, and the third distance M1 is 180 cm, the simplest ratio of the second distance L1 to the third distance M1 may be 1:3. Therefore, the relative distance LL may be 1, and the relative distance MM may be 3, but not limited thereto. In some embodiments, when the second distance L1 is 60 cm, and the third distance M1 is 90 cm, the relative distance LL may be 2, and the relative distance MM may be 3. In addition, after the relative distance LL and the relative distance MM are determined, a relative distance AA between the rear surface RS of the display module DM and the reflection element RE may thereby be calculated. For example, when the second distance L1 is 60 cm, and the third distance M1 is 180 cm, the first distance A1 may be 60 cm (since the thickness of the display module DM and the thickness of the reflection element RE are neglected). In such condition, the relative distance LL may be 1, the relative distance AA may be 1, and the relative distance MM may be 3. In some embodiments, when the second distance L1 is 60 cm and the third distance M1 is 120 cm, the first distance A1 may be 30 cm. In such condition, the relative distance LL may be 1, the relative distance AA may be 0.5, and the relative distance MM may be 2. That is, the relative distance AA may not be an integer. The definition of the relative distances may be applied to the following content, and will not be redundantly described.

As mentioned above, since the size of the perceived third image IM3' may be smaller than the sizes of the second image IM2 and the third image IM3, the size of the second image IM2 may be designed to be greater than the first image IM1, such that the size of the perceived third image IM3' may match with the size of the first image IM1, such that the first image IM1 can be combined with the perceived third image IM3' to form the predetermined image PIM in viewer's eyes. Specifically, if the size of the second image IM2 is substantially the same as the size of the first image IM1, the size of the perceived third image IM3' may be LL/MM times of the size of the second image IM2 and be smaller than the size of the first image IM1. In such condition, the first image IM1 and the perceived third image IM3' may not be easily combined in viewer's eyes to form the predetermined image PIM. Therefore, the ratio of the size of the first image IM1 to the size of the second image IM2 may be designed according to the relative distance LL and the relative distance MM.

According to the present embodiment, the front pixels FP may be disposed corresponding to the rear pixels RP, and the size of the front pixels FP may for example be the same as the size of the rear pixels RP. Therefore, the difference between the size of the first image IM1 displayed by the front pixels FP and the size of the second image IM2 displayed by the rear pixels RP may for example be achieved by using different numbers of the front pixels FP and rear pixels RP to display the first image IM1 and the second image IM2 respectively, but not limited thereto. The ratio of the number of the front pixels FP for displaying the first image IM1 to the number of the rear pixels RP for displaying the second image IM2 may be related to the relative distance LL and the relative distance MM. In detail, as shown in FIG. 4, since the size (the length LN1 or the width WI1) of the perceived third image IM3' is LL/MM times of the size (the length LN2 or the width WI2) of the second image IM2, the size of the second image IM2 may for example be MM/LL times of the size of the first image IM1, such that the first image IM1 may match with the perceived third image IM3', but not limited thereto. Therefore, when the shapes of the first image IM1 and the second image IM2 are squares, the ratio of the number of the front pixels FP for displaying the first image IM1 in a row (or column) to the number of the rear pixels RP for displaying the second image IM2 in a row (or column) may be LL/MM. To satisfy the number ratio mentioned above, the front pixels FP for displaying the first image IM1 may for example be arranged in a LL*LL array, and the rear pixels RP for displaying the second image IM2 may for example be arranged in a MM*MM array, but not limited thereto. Therefore, the ratio of the number of the front pixels FP for displaying the first image IM1 to the number of the rear pixels RP for displaying the second image IM2 may be square of LL/MM. It should be noted that the number of the front pixels FP for displaying the first image IM1 and the number of the rear pixels RP for displaying the second image IM2 may be increased in multiples while the number ratio of the front pixels FP and the rear pixels RP is not changed. In some embodiments, the front pixels FP for displaying the first image IM1 may for example be arranged in a 2LL*2LL array, and the rear pixels for displaying the second image IM2 may for example be arranged in a 2MM*2MM array. In some embodiments, when the first image IM1 and the second image IM2 are rectangular, the front pixels FP for displaying the first image IM1 may for example be arranged in a xLL*yLL array, and the rear pixels RP for displaying the second image IM2 may for example be arranged in a xMM*yMM array, wherein x and y are any suitable positive integer according to the shape of the first image IM1 and the second image IM2.

Through the above-mentioned design, when the viewer VW observes the display device DD, the viewer VW may make an observation block enclosing the first image IM1 displayed by LL*LL front pixels FP, wherein the observation block may also enclose the size-reduced second image IM2 (that is, the perceived third image IM3') displayed by the MM*MM rear pixels RP, and the predetermined image PIM may thereby be observed by the viewer VW in the observation block through combination of the first image IM1 and the size-reduced second image IM2, but not limited thereto. It should be noted that since the third image IM3 is the reflection of the second image IM2, the pattern of the third image IM3 observed by the viewer VW and the pattern of the second image IM2 displayed on the rear surface RS may be horizontally flipped, as shown in FIG. 4. Therefore, the pattern of the second image IM2 displayed by the rear pixels RP may be horizontally flipped with the sharing image for decrypting the secret visual information, such that the viewer VW may observe the correct pattern of the sharing image. In addition, since the light emitting regions LR including front pixels FP and rear pixels RP may block a portion of the third image IM3, the pattern of the perceived third image IM3' may be slightly different from the second image IM2, but not limited thereto. Specifically, a portion of the pattern in the second image IM2 may not be shown in the perceived third image IM3' observed by the viewer VW.

Figure 5:
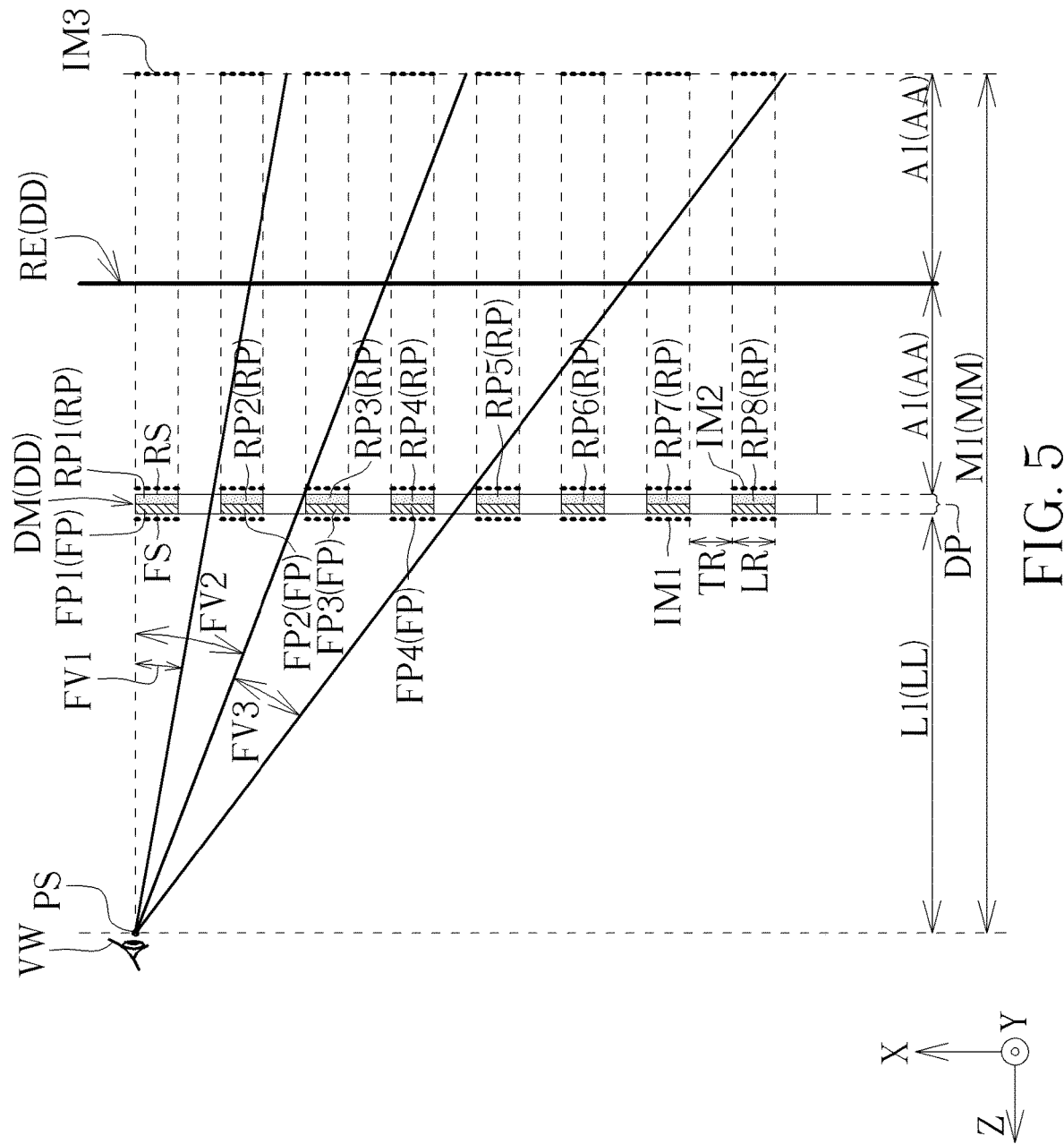
FIG. 5 schematically illustrates the display device according to the first embodiment of the present disclosure being observed by a viewer.

Referring to FIG. 5, FIG. 5 schematically illustrates the display device according to the first embodiment of the present disclosure being observed by a viewer. In the display device DD shown in FIG. 5, the relative distance LL may be 1, and the relative distance MM may be 2, but not limited thereto. Therefore, the ratio of the number of the front pixels FP displaying the first image IM1 along the direction X to the number of the rear pixels RP displaying the second image IM2 along the direction X may be 1/2. According to the present embodiment, the location of the rear pixels RP displaying the second image IM2 may for example be determined through the front pixels FP displaying the first image IM1 and the field of view of the viewer VW, but not limited thereto. For example, as shown in FIG. 5, when the first image IM1 is displayed by the front pixel FP1, and the viewer VW observes the first image IM1 with a field of view FV1, the third image IM3 that can be observed by the viewer VW may be the reflection of the second image IM2 displayed by the rear pixel RP1 and the rear pixel RP2. Therefore, the second image IM2 may be displayed (or defined) by the rear pixel RP1 and the rear pixel RP2, but not limited thereto. In some embodiments, when the first image IM1 is displayed by the front pixel FP1 and the front pixel FP2, and the viewer VW observes the first image IM1 with a field of view FV2, and the third image IM3 that can be observed by the viewer VW may be the reflection of the second image IM2 displayed by the rear pixel RP1, the rear pixel RP2, the rear pixel RP3 and the rear pixel RP4. Therefore, the second image IM2 may be displayed (or defined) by the rear pixel RP1, the rear pixel RP2, the rear pixel RP3 and the rear pixel RP4. In some embodiments, when the first image IM1 is displayed by the front pixel FP3 and the front pixel FP4, and the viewer VW observes the first image IM1 with a field of view FV3, and the third image IM3 that can be observed by the viewer VW may be the reflection of the image displayed by the rear pixel RP5, the rear pixel RP6, the rear pixel RP7 and the rear pixel RP8. Therefore, the second image IM2 may be displayed (or defined) by the rear pixel RP5, the rear pixel RP6, the rear pixel RP7 and the rear pixel RP8. It should be noted that the viewing position PS may be changed, which is not limited to the viewing position PS shown in FIG. 5. In such condition, the location of the rear pixels RP used for displaying or defining the second image IM2 may be determined through the front pixels FP displaying the first image IM1 and the field of view of the viewer VW through the above-mentioned way.

According to some embodiments of the present embodiment, the area of one of the transparent regions TR may be greater than the area of one of the light emitting regions LR (as shown in FIG. 3). In detail, as shown in FIG. 1, the light emitting region LR may include a length F1 along a direction (that is, the direction X) parallel to the extending direction of the display module DM, and the transparent region TR may include a length T1 along the same direction. The length T1 of the transparent region TR may be greater than the length F1 of the light emitting region LR in some embodiments. The length F1 may be defined as the length of the front pixel FP or the rear pixel RP along the direction X, but not limited thereto. The length T1 may be defined as the length of the transparent unit TM along the direction X, but not limited thereto. It should be noted that in some embodiments, the size of the transparent region TR along another direction (such as the lateral direction Y) may also be greater than the size of the light emitting region LR along the another direction. Therefore, the area of the transparent region TR may be greater than the area of the light emitting region LR in some embodiments. Since the area of the transparent region TR may be greater than the area of the light emitting region LR, the portion of the third image IM3 being blocked by the light emitting region LR, which cannot be observed by the viewer VW, maybe reduced, thereby improving the clarity of the formed predetermined image PIM.

In addition, the display module DM may include a pixel pitch PP, wherein the pixel pitch PP may for example be defined as the distance from an upper edge of a front pixel FP (or rear pixel RP) to an upper edge of another front pixel FP (or rear pixel RP) adjacent to the front pixel FP (or rear pixel RP), but not limited thereto. In other words, the pixel pitch PP may be equal to the sum of the length F1 of the light emitting region LR and the length T1 of the transparent region TR, but not limited thereto. According to the present embodiment, the ratio of the length F1 of the light emitting region LR to the pixel pitch PP of the display module DM may for example satisfy the following formula (3).

$$F1/PP \leq 1/MM \quad (3)$$

wherein MM is the relative distance MM between the viewing position PS and the third image IM3 mentioned above. For example, when the relative distance MM is 3, the ratio of the length F1 to the pixel pitch PP may be lower than or equal to 1/3, but not limited thereto. By making the ratio of the length F1 to the pixel pitch PP satisfying the formula (3), the portion of the third image IM3 that can be observed by the viewer VW may increase. Specifically, when the ratio of the length F1 to the pixel pitch PP is lower than or equal to 1/MM, the viewer VW may observe the greatest portion of the third image IM3, thereby improving the clarity of the formed predetermined image PIM.

Figure 6:
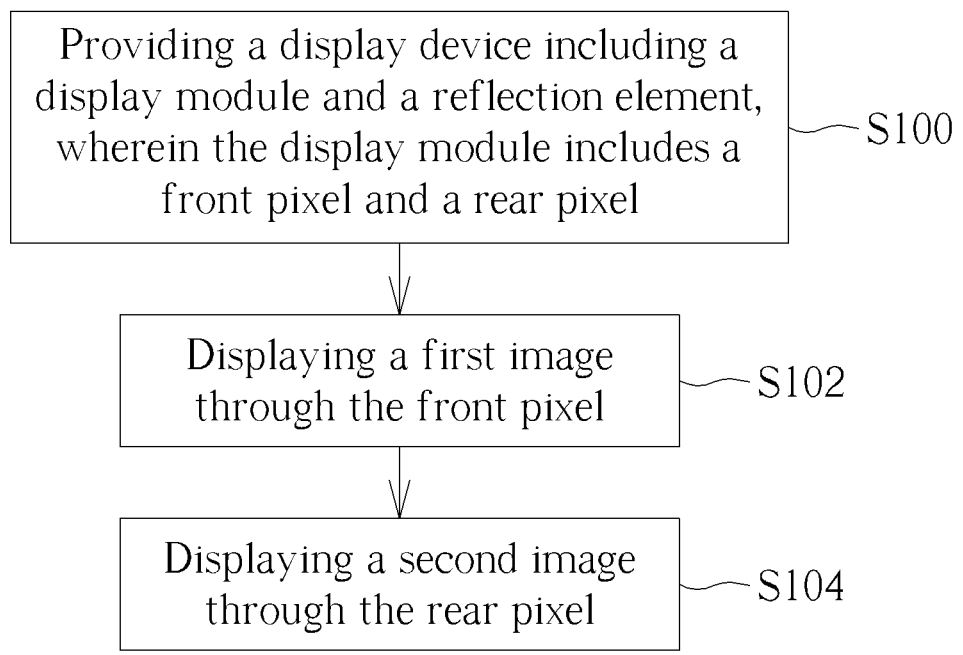
FIG. 6 is a flow chart showing a method of displaying a predetermined image through a display device according to the first embodiment of the present disclosure.

Referring to FIG. 6, FIG. 6 is a flow chart showing a method of displaying a predetermined image through a display device according to the first embodiment of the present disclosure. According to the present embodiment, the method M100 of displaying the predetermined image PIM through the display device DD may include the following steps:

S100: providing a display device including a display module and a reflection element, wherein the display module includes a front pixel and a rear pixel S102: displaying a first image through the front pixel S104: displaying a second image through the rear pixel Wherein the second image is reflected by the reflection element to form a third image in the transparent regions (that is, the viewer may observe the third image through the transparent regions of the display device), and the first image and the third image are combined to form the predetermined image.

In detail, the method M100 of displaying the predetermined image PIM through the display device DD may start from the step S100: providing the display device DD. The detail of the structure of the display device DD may refer to FIG. 1 and the content mentioned above, and will not redundantly described.

In addition, the step S102 may be performed to display the first image IM1 through the front pixels FP, wherein the first image IM1 may be displayed by one or multiple front pixels FP.

In addition, the step S104 may be performed to display the second image IM2 through the rear pixels RP, and the second image IM2 may be reflected through the reflection element RE to form the third image IM3. The relationship between the size of the first image IM1 and the size of the second image IM2 (or the third image IM3) may refer to the above-mentioned content, and will not be redundantly described.

The step S102 and the step S104 may be performed simultaneously.

Then, the viewer may observe the third image IM3 through the transparent regions TR. The observation may be performed by the viewer VW at the viewing position PS, and the image observed by the viewer VW through the transparent regions TR may be the perceived third image IM3'.

After the perceived third image IM3' is observed, the viewer may combine the first image IM1 and the third image IM3 observed through the transparent regions TR to obtain the predetermined image PIM. The predetermined image PIM may be the image where the secret visual information is hidden or may be the image shows the secret visual information.

It should be noted that the method of displaying the predetermined image PIM through the display device DD in the present disclosure is not limited to the above-mentioned method M100, and any suitable step may be incorporated.

Figure 7:
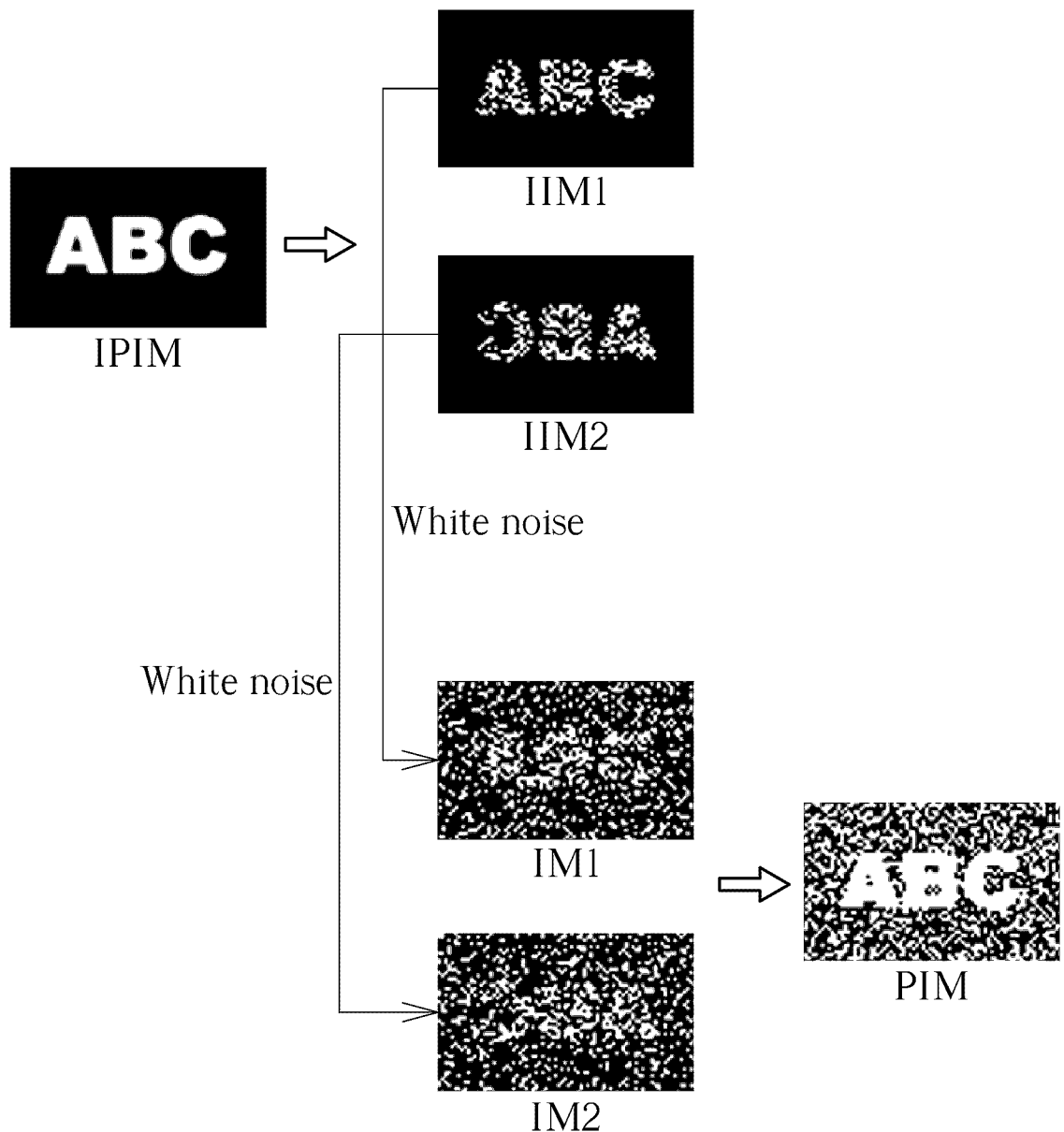
FIG. 7 shows an example of images of a display device according to a second embodiment of the present disclosure.
Figure 8:
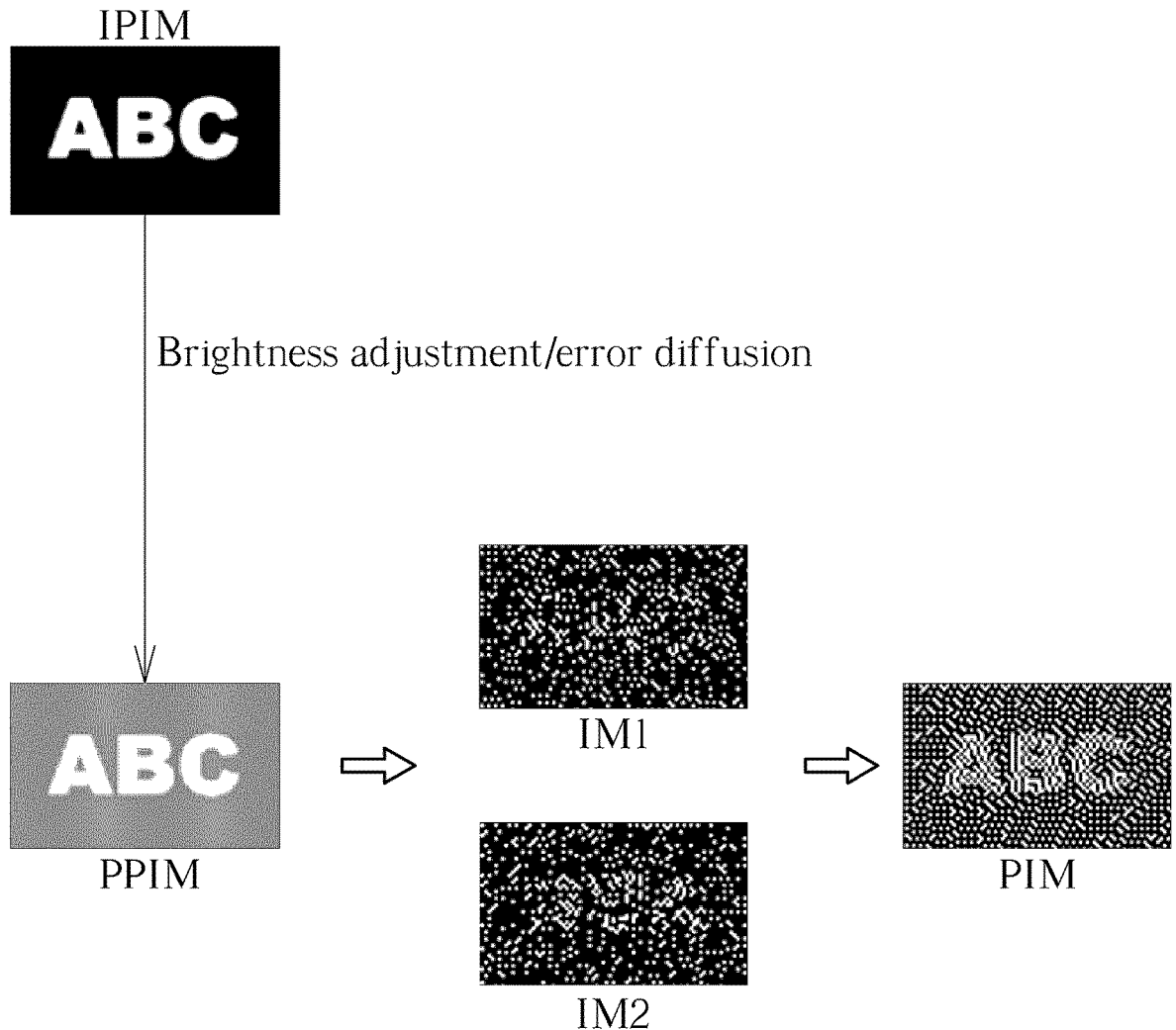
FIG. 8 shows an example of images of a display device according to a third embodiment of the present disclosure.

Referring to FIG. 7 and FIG. 8, FIG. 7 shows an example of images of a display device according to a second embodiment of the present disclosure, and FIG. 8 shows an example of images of a display device according to a third embodiment of the present disclosure. According to the present embodiments, additional treatment may be applied to the images related to the secret visual information, such as the predetermined image PIM, the first image IM1 or the second image IM2, but not limited thereto. Some examples will be detailed in the following.

In some embodiments, white noise maybe added into the sharing images for encrypting the secret visual information. For example, as shown in FIG. 7, the secret visual information (the word "ABC") maybe shown in an original predetermined image IPIM, and the original predetermined image IPIM may be encrypted into two sharing images, which are respectively named as the first encrypting image IIM1 and the second encrypting image IIM2. After that, white noise may respectively be added into the first encrypting image IIM1 and the second encrypting image IIM2 to respectively form the first image IM1 and the second image IM2, wherein the first image IM1 and the second image IM2 may respectively be displayed by the front pixels FP and the rear pixels RP in the display module DM to form the predetermined image PIM. Therefore, the first image IM1 may be a combination of the first encrypting image IIM1 and white noise, and the second image IM2 may be a combination of the second encrypting image IIM2 and white noise. In other words, the first image IM1 can be seemed as a processed encrypting image of the first encrypting image IIM1 and the second image IM2 can be seemed as a processed encrypting image of the second encrypting image IIM2, and therefore the front pixels FP may display the first image IM1 instead of the original first encrypting image IIM1, and the rear pixels RP may display the second image IM2 instead of the original second encrypting image IIM2. It should be noted that the second encrypting image IIM2 and the second image IM2 show the patterns that are horizontally flipped with the real pattern shown in the sharing image since the image observed by the viewer VW would be the reflection of the second image IM2. In addition, the images in FIG. 7 do not show the real sizes of the patterns. As shown in FIG. 7, before adding white noise into the first encrypting image IIM1 and the second encrypting image IIM2, the possibility of recognizing the secret visual information by merely observing the first encrypting image IIM1 or the second encrypting image IIM2 may be higher, thereby affecting the security of the secret visual information. In another aspect, since the first image IM1 displayed by the front pixels FP and the second image IM2 displayed by the rear pixels RP may include white noise, the clarity of the hidden information in the first image IM1 and the second image IM2 may be reduced, such that the secret visual information may not be easily observed through the first image IM1 or the second image IM2, thereby improving the security of the secret visual information. In addition, although white noise would appear in the predetermined image PIM, it may have no effect on recognizing the secret visual information in the predetermined image PIM. It should be noted that the noise added into the images is not limited to the above-mentioned white noise in the present embodiment. The process of applying white noise may belong to one step of encrypting process of the present disclosure, but not limited thereto.

In some embodiments, as shown in FIG. 8, a brightness adjustment and/or error diffusion may be applied to the original predetermined image IPIM before the original predetermined image IPIM is encrypted, such that the gray level of the original predetermined image IPIM may be changed, as shown as the processed predetermined image PPIM. Therefore, after the processed predetermined image PPIM is encrypted into the first image IM1 and the second image IM2, the clarity of hidden information in the first image IM1 and the second image IM2 maybe reduced, such that the secret visual information may not be easily observed through the first image IM1 or the second image IM2, thereby improving the security of the secret visual information. In other words, the predetermined image PIM may be obtained by applying brightness adjustment and/or error diffusion to the original predetermined image IPIM in the present embodiment. The process of applying brightness adjustment and/or error diffusion may belong to one step of encrypting process of the present disclosure, but not limited thereto.

Figure 9:
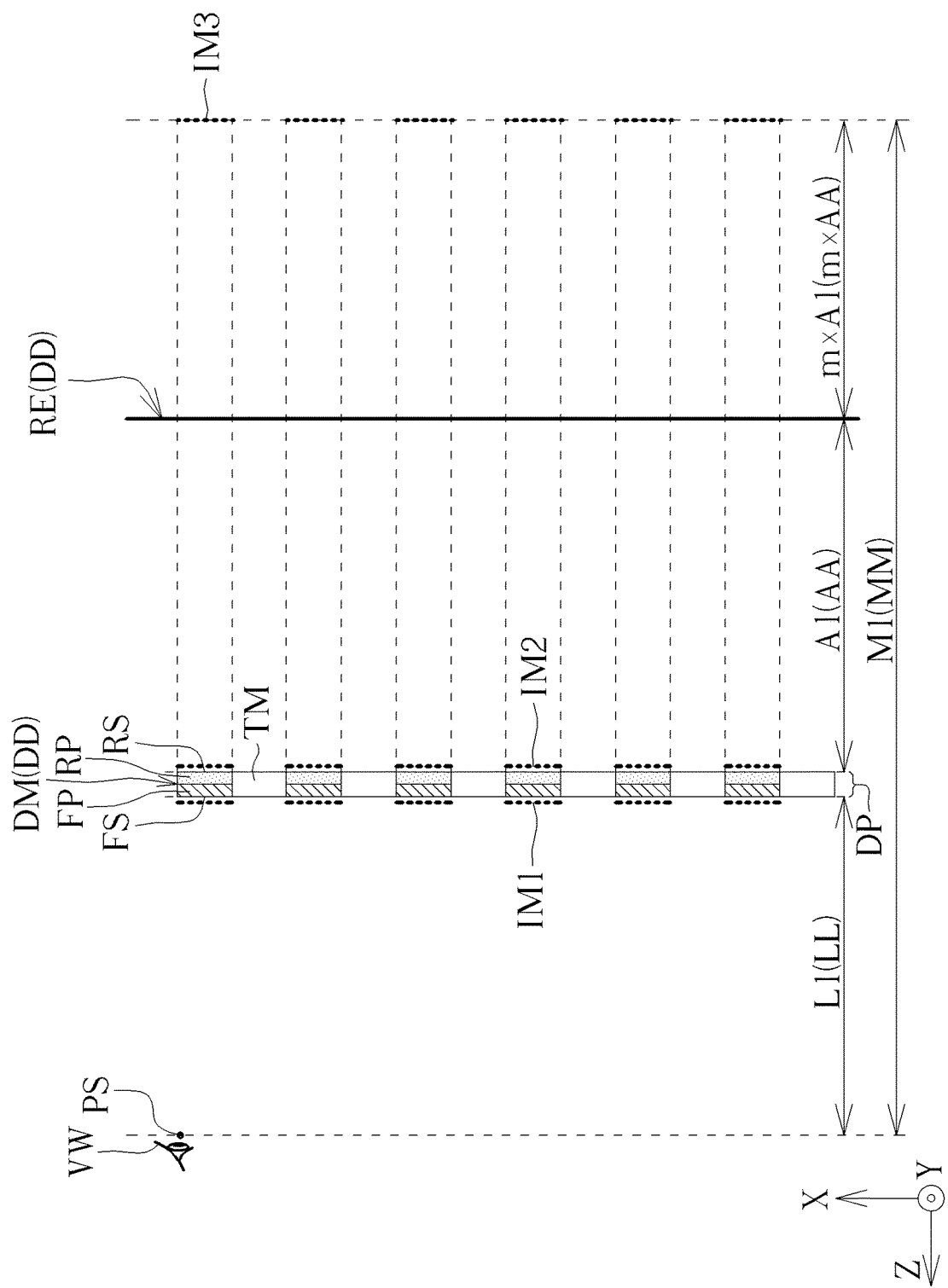
FIG. 9 schematically illustrates a cross-sectional view of a display device according to a fourth embodiment of the present disclosure.

Referring to FIG. 9, FIG. 9 schematically illustrates a cross-sectional view of a display device according to a fourth embodiment of the present disclosure. According to the present embodiment, the reflection element RE of the display device DD may be a concave mirror, but not limited thereto. Therefore, the first distance A1 between the rear surface RS of the display module DM and the reflection element RE may be different from the distance between the reflection element RE and the third image IM3. In detail, the concave mirror as the reflection element RE may have a magnification m, and the distance between the reflection element RE and the third image IM3 may be m times of the first distance A1. Therefore, the ratio R1 of the size of the perceived third image IM3' (not shown in FIG. 9) to the size of the second image IM2, which may be the ratio of the second distance L1 to the third distance M1, may satisfy the following formula (4).

$$R1=L1/[L1+(1+m)*A1] \qquad (4)$$

Therefore, comparing to the first embodiment mentioned above, the size of the second image IM2 or the number of the rear pixels RP displaying (or defining) the second image IM2 may be related to the magnification m of the reflection element RE in the present embodiment.

In addition, the magnification m of the reflection element RE may not be equal to MM/LL in the present embodiment. In detail, if the magnification m is equal to MM/LL, the third image IM3 may be blocked by the light emitting regions LR when the viewer VW observes the display device DD since the light emitted by the rear pixels RP and reflected by the reflection element RE maybe blocked by the rear pixels RP. In such condition, the third image IM3 may not be observed by the viewer VW through the transparent regions TR, and the display device DD may not provide the decryption function, or the secret visual information may not be easily obtained from the formed predetermined image PIM.

In summary, the display device capable of decrypting secret visual information is provided by the present disclosure, wherein the display device includes the front pixels displaying the first image as a sharing image, the rear pixels displaying the second image as another sharing image, and the reflection element for reflecting the second image, such that the viewer may directly observe the combined image formed of the sharing images. Therefore, additional software or other devices may not be needed for decrypting the secret visual information, thereby improving the decryption process or making the decryption easier.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A display device having a plurality of light emitting regions and a plurality of transparent regions alternately disposed, comprising:
a display module comprising a front pixel and a rear pixel disposed opposite to the front pixel, wherein the front pixel and the rear pixel are disposed in the plurality of light emitting regions, and the front pixel displays a first image in the plurality of light emitting regions; and
a reflection element disposed at a side of the display module adjacent to the rear pixel, wherein the reflection element reflects a second image displayed by the rear pixel to form a third image,
wherein the first image in the plurality of light emitting regions and the third image in the plurality of transparent regions are combined to show a predetermined image;
wherein the reflection element is apart from the display module by a first distance A1, a second distance L1 is included between a viewing position and the display module, and a ratio R1 of a size of a perceived third image to a size of the second image satisfies the following equation:

$$R1=L1/(L1+2*A1).$$

2. The display device of claim 1, wherein the display module includes a display panel, and the front pixel and the rear pixel are both disposed in the display panel.

3. The display device of claim 1, wherein the display module includes two display panels attached to each other, the front pixel is disposed in one of the two display panels, and the rear pixel is disposed in another one of the two display panels.

4. The display device of claim 1, wherein the front pixel includes mini light emitting diodes, micro light emitting diodes, or organic light emitting diodes.

5. The display device of claim 1, wherein the rear pixel includes mini light emitting diodes, micro light emitting diodes, or organic light emitting diodes.

6. The display device of claim 1, wherein an area of one of the plurality of transparent regions is greater than an area of one of the plurality of light emitting regions.

7. The display device of claim 1, wherein the reflection element is a flat mirror.

8. The display device of claim 1, wherein the reflection element is a concave mirror.

9. The display device of claim 1, wherein the third image is a virtual image.

10. A method of displaying a predetermined image through a display device, comprising:
providing the display device, the display device having a plurality of light emitting regions and a plurality of transparent regions alternately disposed, wherein the display device comprises a display module and a reflection element, the display module includes a front pixel and a rear pixel disposed opposite to the front pixel, and the reflection element is disposed at a side of the display module adjacent to the rear pixel;
displaying a first image through the front pixel, wherein the first image is located in the plurality of light emitting regions; and
displaying a second image through the rear pixel,
wherein the second image is reflected by the reflection element to form a third image in the plurality of transparent regions, and the first image and the third image are combined to form the predetermined image;
wherein the reflection element is apart from the display module by a first distance A1, a second distance L1 is included between a viewing position and the display module, and a ratio R1 of a size of a perceived third image to a size of the second image satisfies the following equation:

$$R1=L1/(L1+2*A1).$$

11. The method of claim 10, wherein the first image is a combination of a first original image and white noise, and the second image is a combination of a second original image and white noise.

12. The method of claim 10, wherein the predetermined image is obtained by applying brightness adjustment to an original predetermined image.

13. The method of claim 10, wherein the predetermined image is obtained by applying error diffusion to an original predetermined image.

14. The method of claim 10, wherein the display module includes a display panel, and the front pixel and the rear pixel are both disposed in the display panel.

15. The method of claim 10, wherein the display module includes two display panels attached to each other, the front pixel is disposed in one of the two display panels, and the rear pixel is disposed in another one of the two display panels.

16. The method of claim 10, wherein an area of one of the plurality of transparent regions is greater than an area of one of the plurality of light emitting regions.

17. The method of claim 10, wherein the reflection element is a flat mirror.

18. The method of claim 10, wherein the reflection element is a concave mirror.

* * * * *